(12) United States Patent
Ann et al.

(10) Patent No.: US 8,139,946 B2
(45) Date of Patent: Mar. 20, 2012

(54) APPARATUS AND METHOD FOR TRANSMITTING DATA IN WIRELESS VISIBLE LIGHT COMMUNICATION SYSTEM

(75) Inventors: Jong-Hoon Ann, Suwon-si (KR);
Jae-Seung Son, Suwon-si (KR);
Eun-Tae Won, Seoul (KR);
Noh-Gyoung Kang, Seoul (KR);
Seung-Hoon Park, Seoul (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 634 days.

(21) Appl. No.: 12/351,092

(22) Filed: Jan. 9, 2009

(65) Prior Publication Data

US 2009/0180780 A1 Jul. 16, 2009

(30) Foreign Application Priority Data

Jan. 11, 2008 (KR) .................. 10-2008-0003555

(51) Int. Cl.
*H04B 10/00* (2006.01)

(52) U.S. Cl. ........ 398/128; 398/130; 398/140; 398/158; 398/182; 398/202

(58) Field of Classification Search .................. 398/128, 398/130, 140, 158, 182
See application file for complete search history.

(56) References Cited

U.S. PATENT DOCUMENTS

| 2008/0220726 A1* | 9/2008 | Gulati et al. ................... 455/69 |
| 2009/0269073 A1* | 10/2009 | Kitaji ............................ 398/130 |
| 2010/0029320 A1* | 2/2010 | Malladi et al. ............... 455/522 |

* cited by examiner

*Primary Examiner* — Dung Nguyen
(74) *Attorney, Agent, or Firm* — Cha & Reiter, LLC (57) ABSTRACT

Disclosed is a method for transmitting data in a wireless visible light communication system, the method including the steps of transmitting a pilot signal for obtaining channel state information according to each channel from a transmitter to a receiver, and transmitting a pilot response signal containing channel state information according to each channel from the receiver to the transmitter; controlling, by the transmitter, a data rate according to the pilot response signal, transmitting, by the transmitter, data to the receiver, with data rate information inserted into a header and controlling, by the receiver, a data rate according to each channel by making reference to data included in the header information.

14 Claims, 7 Drawing Sheets

APPARATUS AND METHOD FOR TRANSMITTING DATA IN WIRELESS VISIBLE LIGHT COMMUNICATION SYSTEM

CLAIM OF PRIORITY

This application claims the benefit of the earlier filing date, pursuant to 35 USC 119, to that patent application entitled "Apparatus And Method For Transmitting Data In Wireless Visible Light Communication System" filed with the Korean Intellectual Property Office on Jan. 11, 2008 and assigned Serial No. 2008-0003555, the contents of which are incorporated herein by reference.

BACKGROUND OF THE INVENTION

1. Field of the Invention

The present invention relates to a wireless visible light communication system, and more particularly to an apparatus and method for transmitting information using a wavelength division multiplexing (WDM) scheme in a wireless visible light communication system.

2. Description of the Related Art

Korea's Ministry of Commerce, Industry and Energy has forecasted that current illuminations will be replaced with LED by the year 2015. Visible light communication refers to a system for wirelessly transmitting data through use of objects, such as light emitting diode (LED)-based indoor/outdoor illuminations, advertising boards, traffic lights, street lights and the like. Such a visible light communication system can be applied in such diverse locations as a hospital, an airplane, etc., where the use of radio frequency (RF) is limited, and can provide supplementary information service using an electric display board.

The Wavelength Division Multiplexing (WDM) technology refers to a technology that carries various data, received from different places, through a single optical fiber, and corresponds to a light transmission scheme for increasing the communication capacity and speed. Each piece of data is transmitted at a specific optical wavelength, where one optical fiber can carry up to 80 wavelengths or data channels. This means that the amount of transmission data to be transmitted through the conventional optical fiber can increase up to 80 times. According to the WDM technology, different types of data with different transmission rates, such as Internet data, synchronous optical network (SONET) data, and asynchronous transfer mode (ATM) data, can be transmitted together. There is an attempt to apply such a WDM transmission technology to a white LED. In the case of an RGB LED, which is a kind of white LED, it is possible to apply a wired WDM technology to wireless visible light communication in such a manner as to independently transmit pieces of data through each channel of Red, Green, and Blue light.

Figure 1:
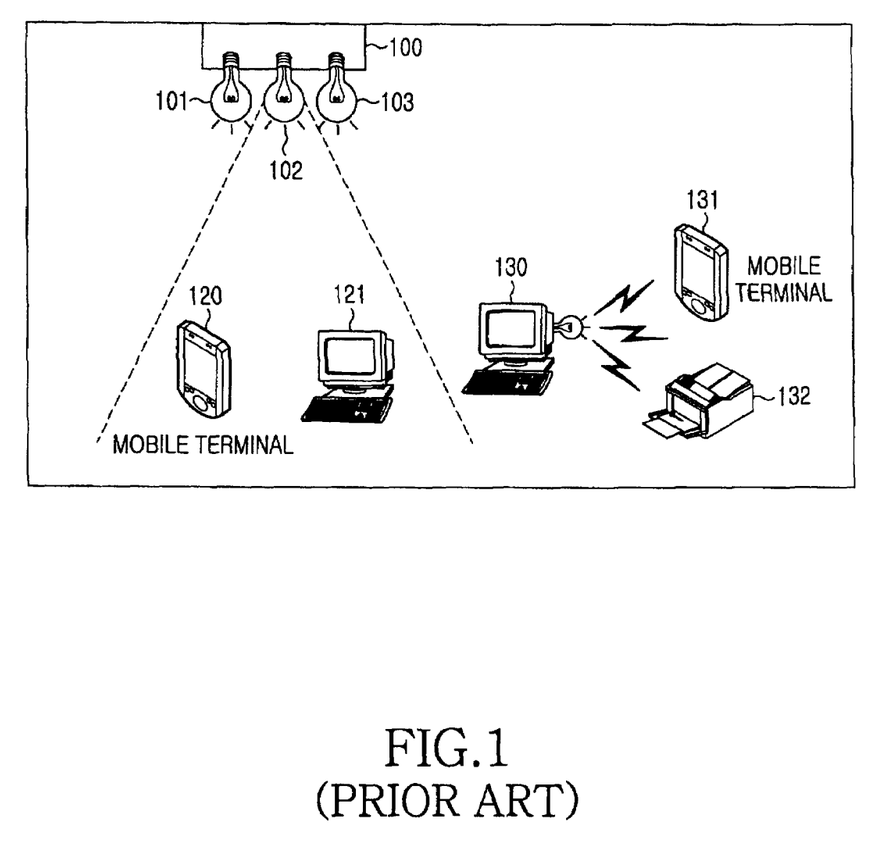
FIG. 1 is a view illustrating the configuration of a conventional visible light communication system.

FIG. 1 is a view illustrating the configuration of a conventional visible light communication system and represents an application scheme of visible light communication, which is performed through visible light.

Referring to FIG. 1, an access point (AP) 100 including a plurality of LEDs transmits a visible light signal to a terminal. The AP 100 includes a plurality of LEDs 101, 102, and 103. The terminal may include a mobile terminal 120 and a fixed-type terminal 121. FIG. 1 shows a case where the AP performs both an illumination function and a communication function at the same time. In addition, a case of communication between terminals may be considered. When communication between terminals 130, 131, and 132 is performed through use of visible light, the user can select an object to communicate and can communicate with the object while seeing a communication-available range, so that the system has a function of providing high safety in terms of security, rather than an illumination function.

Figure 2:
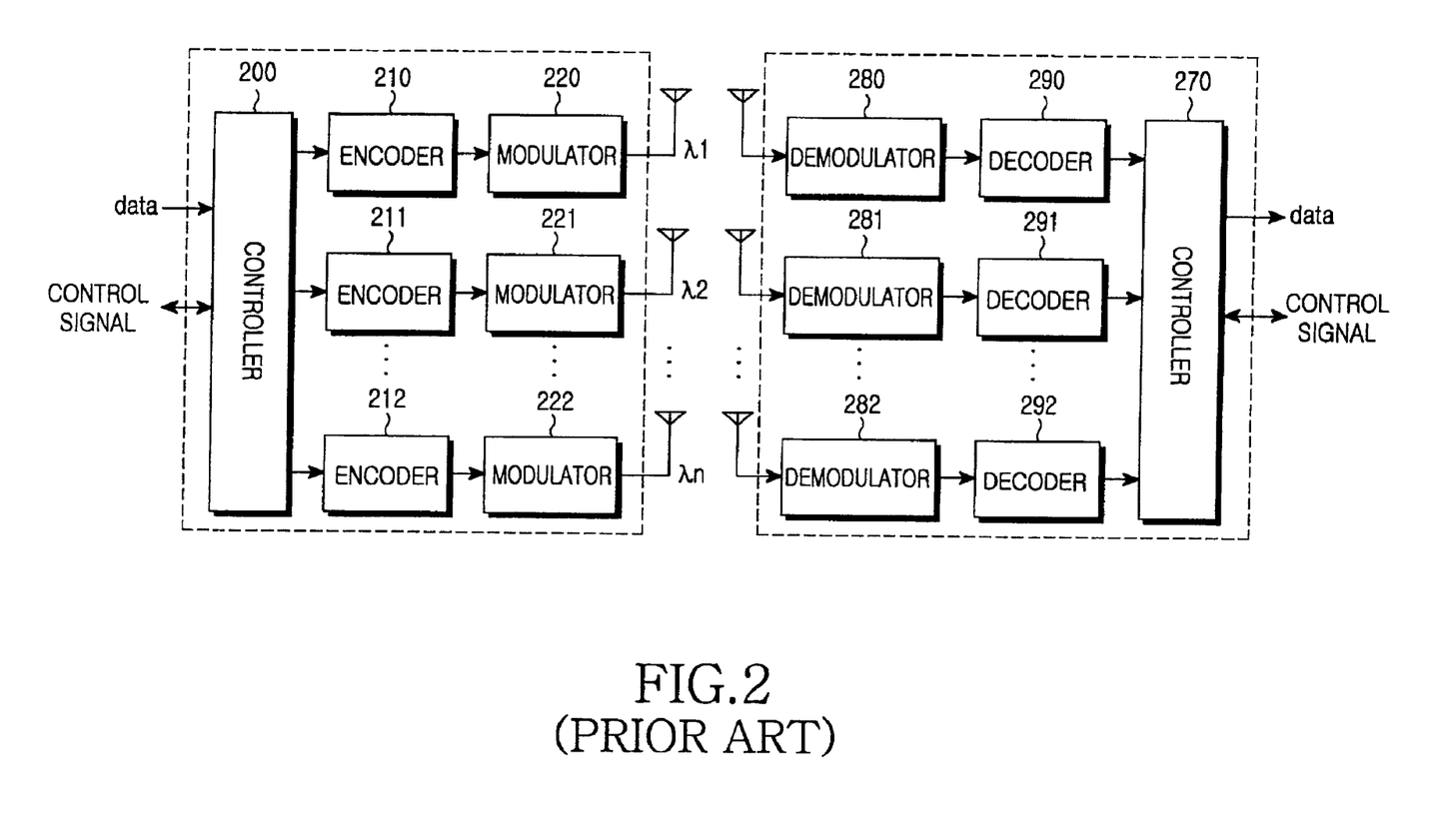
FIG. 2 is a block diagram illustrating the configuration of conventional WDM visible-light communication transmitter/receiver.

FIG. 2 is a block diagram illustrating the configuration of conventional WDM visible-light communication transmitter/receiver.

The visible light communication transmitter includes a plurality of encoders 210, 211, and 212 that are connected in parallel with each other and channel-code data to transmit; a plurality of modulators 220, 221, and 222 which are connected in parallel with each other and modulate data channel-coded by the encoders; at least one light generator for transmitting a signal, modulated by the modulators, as a visible light signal; and a controller 200 for controlling each component in the visible light communication transmitter.

The visible light communication receiver includes at least one light sensor for receiving a visible light signal; a plurality of demodulators 280, 281, and 282 that are connected in parallel with each other and demodulate a signal received from the light sensor; a plurality of decoders 290, 291, and 292 that are connected in parallel with each other and, receive a signal demodulated by the demodulators. The decoders perform a channel decoding operation on the demodulated signal so as to restore data; and a controller 270 for controlling each component in the visible light communication receiver. In the WDM visible-light communication apparatus, communication paths operate independently according to the path to transmit information has been determined.

Figure 3:
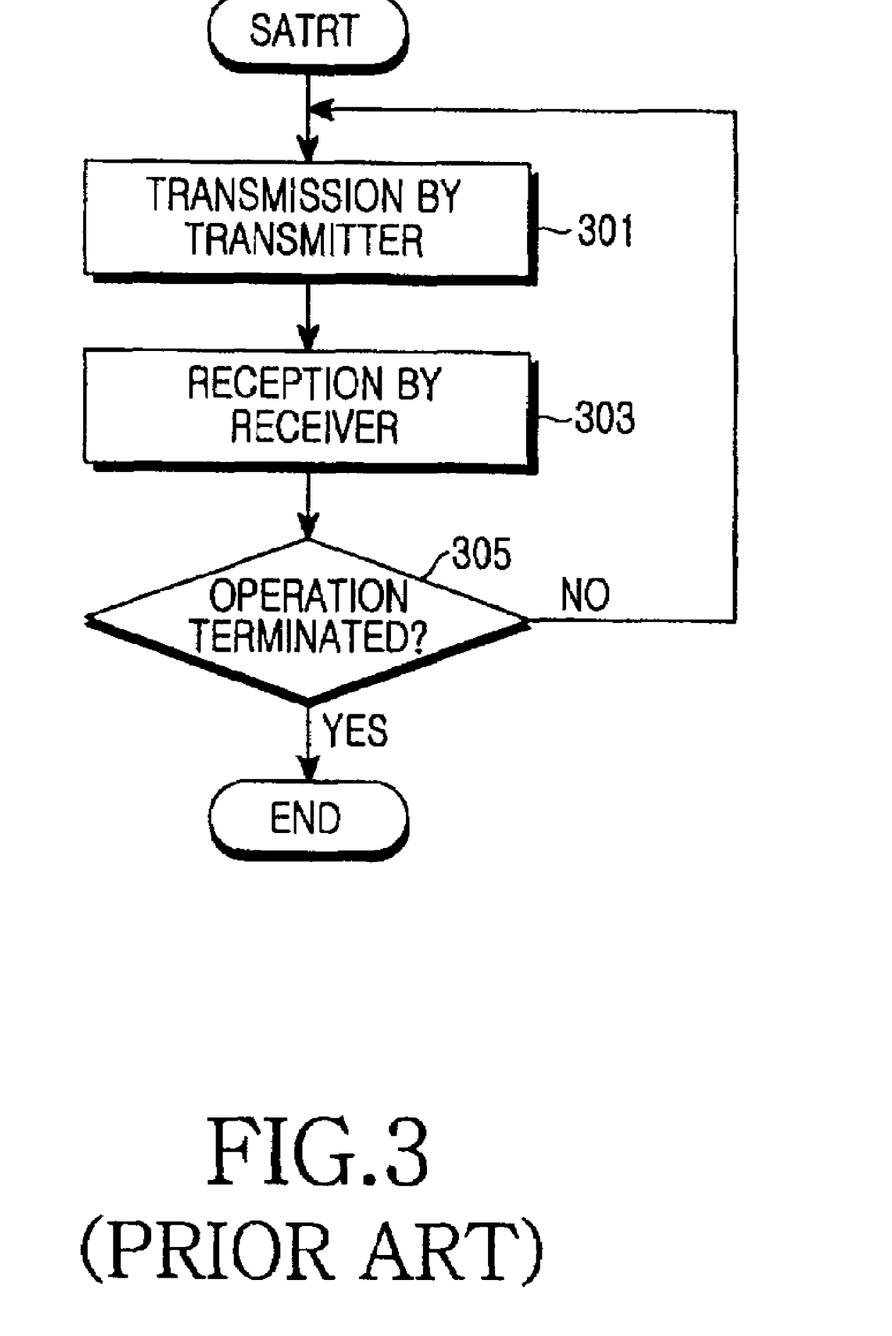
FIG. 3 is a flowchart illustrating a conventional transmission/reception operation for WDM visible-light communication.

FIG. 3 is a flowchart illustrating a conventional transmission/reception operation for WDM visible-light communication.

The visible light communication transmitter/receiver start their operations, the visible light communication transmitter transmits a visible light signal in step 301, and the visible light communication receiver receives the visible light signal from the visible light communication transmitter in step 303. In step 305, it is determined if the transmission/reception operations are completed. When it is determined that the transmission/reception operations are completed, the transmission/reception operations of the visible light communication are terminated. In contrast, when it is determined that the transmission/reception operations are not completed, the procedure returns to step 301 and the above steps are repeated until the transmission/reception operations are completed.

A color of light is determined according to the energy ratio among the three primary colors mixed together. That is, the energy distribution rate according to each wavelength of light determines the color of light. The relation between energy according to each wavelength of light and the color of light can be identified by making reference to a chromaticity diagram.

Figure 4:
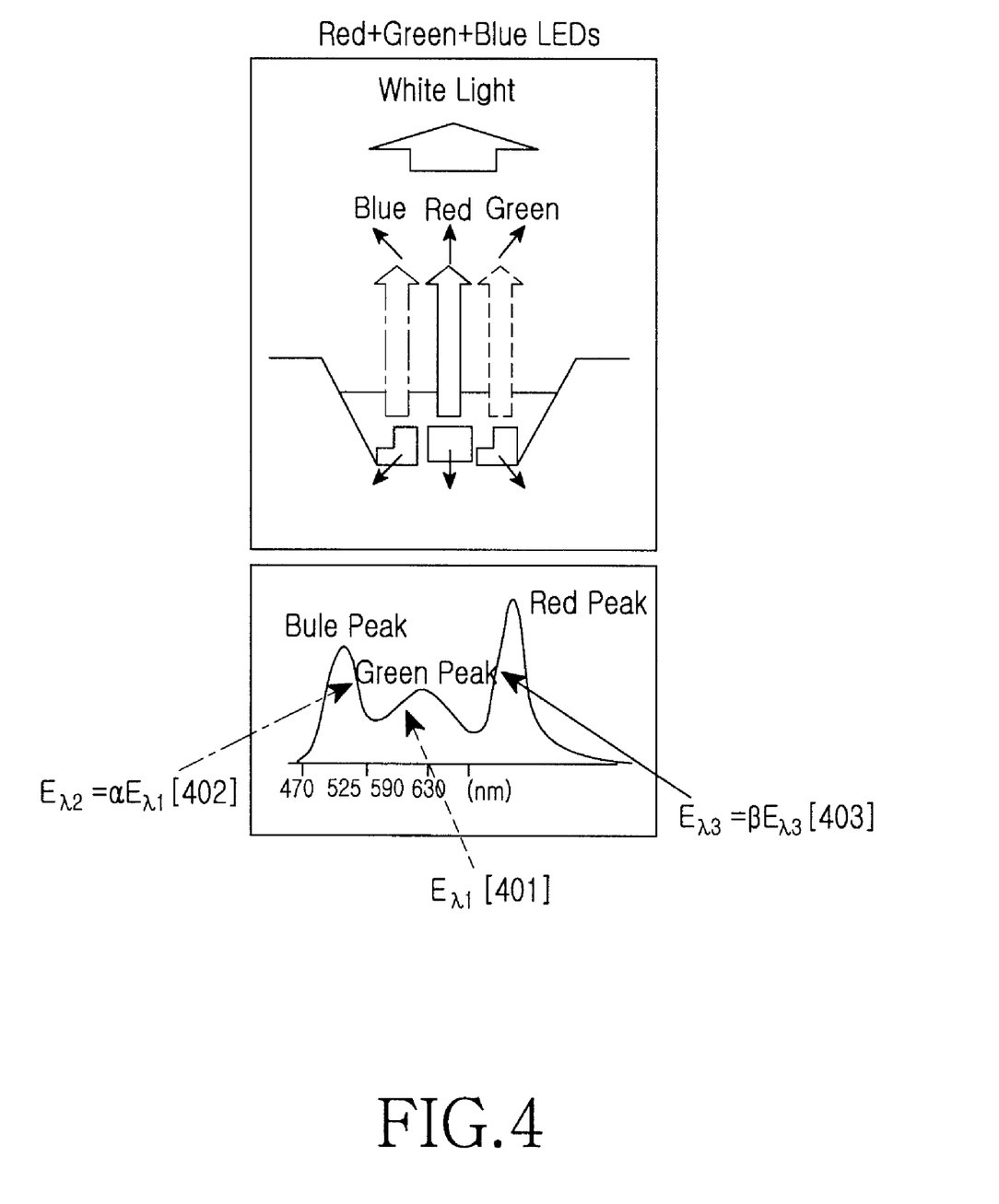
FIG. 4 is a view illustrating the energy distribution according to each wavelength when white light is made in the conventional scheme.

FIG. 4 is a view illustrating the energy distribution according to each wavelength when white light is made in the conventional scheme, wherein the energy distribution according to each wavelength is obtained when white light is made by generating light through use of a red LED, a blue LED, and a green LED, and mixing the generated light.

White light has energy existing over all wavelength bands of red, green, and blue, but the energy distribution shows different energy levels according to wavelengths. That is, the green energy level is lowest, and energy levels are higher in the sequence of blue and red.

The conventionally used WDM technology is usually used for optical fiber communication. In this case, there is no difference between energies allocated according to wavelengths of red, green, and blue, so that the same value is given to each independent channel, and the same energy are allocated to each wavelength.

In contrast, a white LED used for illumination includes different transmission energies depending on each wavelength band, as shown in FIG. 4. Therefore, when the WDM technology is applied under such an environment, the transmission energies of wavelengths become the same, so that the original function as an illumination is lost due to the imbalance of a color ratio. In order to solve such a problem, there is a request for a WDM technology that enables the greatest transmission capability to be obtained while controlling the energy ratio among RGB colors.

SUMMARY OF THE INVENTION

Accordingly, the present invention provides an apparatus and method for controlling the power rate of each wavelength of red, green, and blue, and dividing data rates according to the power rate of each wavelength in wireless visible light communication, thereby applying the optimum WDM technology.

In accordance with an aspect of the present invention, there is provided a method for transmitting data in a wireless visible light communication system, the method including the steps of transmitting a pilot signal for obtaining channel state information according to each channel from a transmitter to a receiver, and transmitting a pilot response signal containing channel state information according to each channel from the receiver to the transmitter, controlling, by the transmitter, a data rate according to the pilot response signal; transmitting, by the transmitter, data to the receiver, with data rate information inserted into a header; and controlling, by the receiver, a data rate according to each channel by making reference to data included in the header information.

In accordance with another aspect of the present invention, there is provided an apparatus for transmitting data in a wireless visible light communication system, the apparatus including a transmitter for controlling a data rate and power so as to uniformly maintain light of a color preset by a user and a receiver for receiving the data rate included in a header from the transmitter.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Hereinafter, one exemplary embodiment of the present invention will be described in detail with reference to the accompanying drawings. In the below description, many particular items such as a detailed component device are shown, but these are given only for providing the general understanding of the present invention. It will be understood by those skilled in the art that various changes in form and detail may be made within the scope of the present invention.

Figure 5:
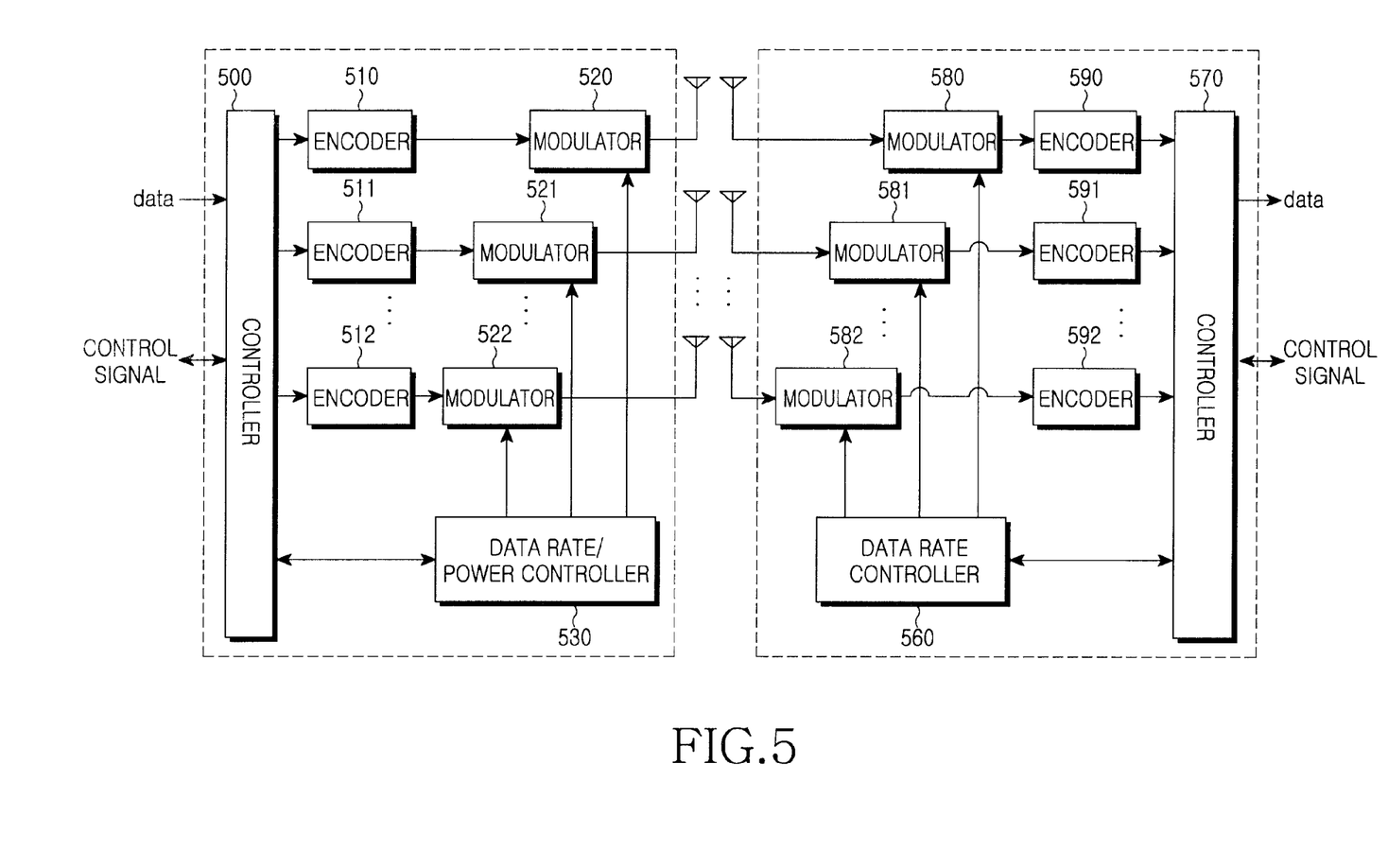
FIG. 5 is a block diagram illustrating the configuration of WDM visible-light transmitter/receiver according to an exemplary embodiment of the present invention.

A white LED used for illumination includes different transmission energies depending on wavelength bands, but when the conventional WDM technology is applied, the transmission energies of the wavelengths become the same, so that the original function of the light as an illumination is lost due to the imbalance of the color ratio in the WDM technology. Accordingly, the present invention proposes a new WDM scheme of controlling the power rate of each wavelength of red, green, and blue, controlling a data rate according to the power rate of each wavelength, and transmits data at the controlled data rate. FIG. 5 is a block diagram illustrating the configuration of WDM visible-light transmitter/receiver according to an exemplary embodiment of the present invention.

The visible light communication transmitter includes a plurality of encoders 510, 511, and 512 which are connected in parallel with each other and channel-code data to transmit; a plurality of modulators 520, 521, and 522 which are connected in parallel with each other and modulate data channel-coded by the encoders; a light generator for transmitting a signal, modulated by the modulators, as a visible light signal; a data rate/power controller 530 for controlling power and a data rate according to each wavelength; and a controller 500 for receiving data to transmit and controlling each component in the visible light communication transmitter.

The visible light communication receiver includes a light receiver for receiving a visible light signal; a plurality of demodulators 580, 581, and 582 which are connected in parallel with each other and demodulate a corresponding modulated signal received from the light receiver; a plurality of decoders 590, 591, and 592 which are connected in parallel with each other, receive a signal demodulated by the demodulators, and perform a channel decoding operation on the demodulated signal so as to restore channel-coded data; a data rate controller 560 for controlling data rates which are different according to each wavelength; and a controller 570 for transmitting received data and controlling each component in the visible light communication receiver.

The WDM visible-light transmitter/receiver use red, green, and blue light as carriers in light communication in order to transmit/receive an optical signal corresponding to light of a color set by the user. For example, among the plurality of encoders in the visible light communication transmitter, one encoder may transmit a red light signal, another encoder may transmit a blue light signal, and a still another encoder may transmit a green light signal. Each encoder controls the ratio among the intensities of optical signals according to each color so as to uniformly maintain light of a color set by the user.

The method for supporting data rates which are different depending on each wavelength according to the present invention will now be described with reference to the block diagram shown in FIG. 6.

Figure 6:
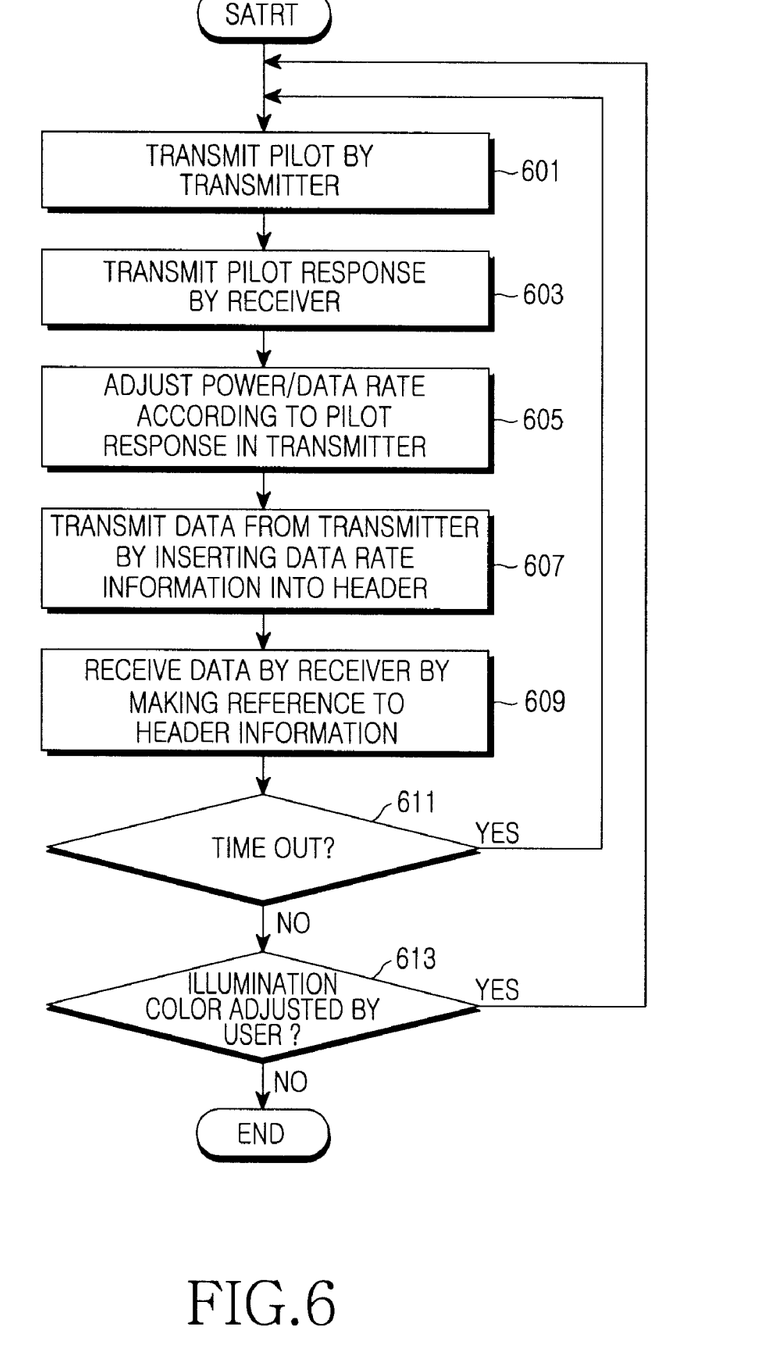
FIG. 6 is a flowchart illustrating an operational procedure of the WDM visible-light transmitter/receiver according to an exemplary embodiment of the present invention.

FIG. 6 is a flowchart illustrating an operational procedure of the WDM visible-light transmitter/receiver according to an exemplary embodiment of the present invention. The operations performed according to each step are as follows.

When the transmitter/receiver start their operations, the transmitter transmits a signal for obtaining channel state information according to each wavelength of Red (R), Green (G), and Blue (B), to the receiver in step 601. In this document, the signal will be called a pilot signal. The receiver, which receives the pilot signal from the transmitter, functions to determine state information of each channel. This is illustrated in FIG. 7A.

Figure 7A:
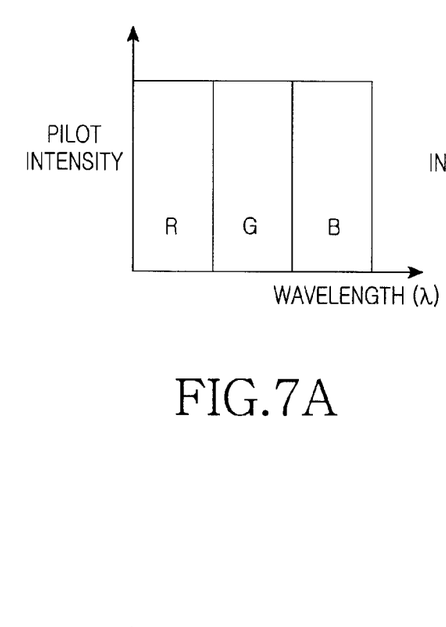
FIGS. 7A to 7D are graphs showing signals of each wavelength according to an exemplary embodiment of the present invention.
Figure 7B:
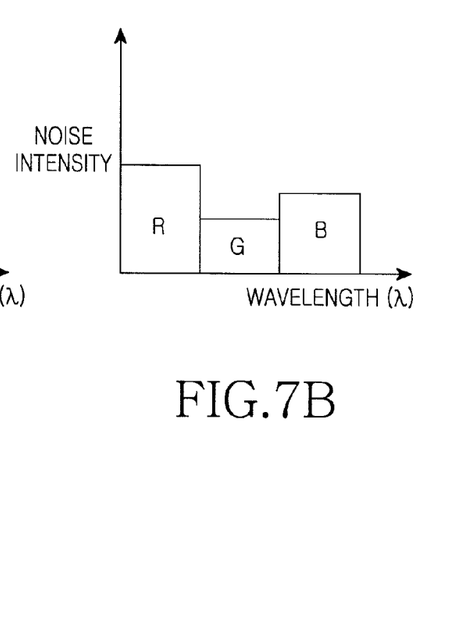
Figure 7C:
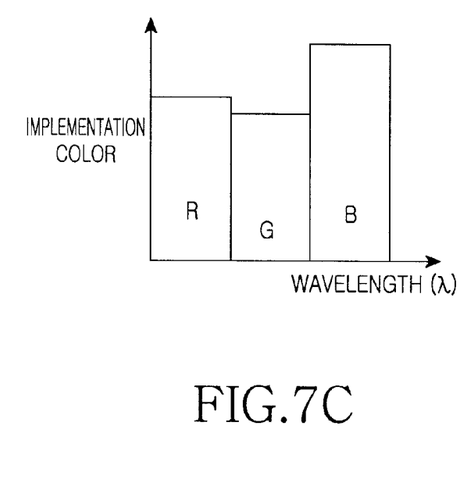
Figure 7D:
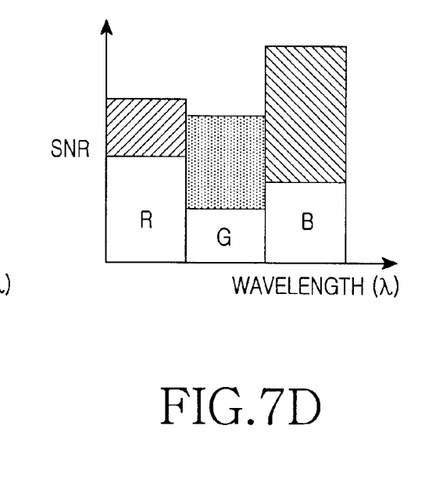

FIGS. 7A to 7D are graphs showing signals of each wavelength according to an exemplary embodiment of the present invention, wherein FIG. 7A is a graph showing an example of transmission of signals having the same intensity, FIG. 7B is a graph showing different intensities of noise, FIG. 7C is a graph showing colors to implement, and FIG. 7D is a graph showing a signal-to-noise ratio for determining a data rate for data to be actually transmitted.

FIG. 7A shows pilot signals having the same intensity for the respective wavelengths, as an example. However, although pilot signals have different intensities depending on wavelengths, a receiver can identify the difference because the respective pilot signals are input to the receiver, so that it is possible to measure noise of a channel by using the difference.

Returning to FIG. 6, in step 603, the receiver measures channel information according to each wavelength and generates a channel response signal, in response to the pilot signal for obtaining channel information according to each wavelength of RGB, which has been received. The channel response signal may be called a pilot response signal, and the receiver transmits a pilot response signal containing a channel response signal to the transmitter. Thereafter, in step 605, the transmitter identifies a noise level according to each wavelength through use of the pilot response signal received from the receiver, analyzes a signal-to-noise ratio according to each wavelength, and controls a data rate in order to generate light of a color set by the user.

An example of step 605 may be expressed as graphs of FIGS. 7B, 7C, and 7D described above. When the ratio of intensities of RGB color noises of a color which the user wants to implement is expressed as FIG. 7B, and the ratio of RGB colors of the color which the user wants to implement is expressed as FIG. 7C, a signal-to-noise ratio for determining a data rate corresponding to the difference between the signal level and the noise level may be expressed as FIG. 7D.

In FIG. 7D, the portion corresponding to a difference between the intensity of a user implementation color and the intensity of noise can be defined as an SNR of each RGB channel. An electrical signal is converted into a bit number in order to transmit/receive data, wherein, when a bit allocation algorithm using an SNR margin (i.e. the minimum SNR at which a signal can be restored) is applied, a bit number allocated to each wavelength may be expressed as the following equation.

$$b_i = \log_2\left(1 + \frac{SNR_i}{\Gamma}\right) \quad (1)$$

wherein "i" includes red light, green light, and blue light, "$SNR_i$" represents a signal-to-noise ratio of each channel, and "$\Gamma$" represents a signal-to-noise ratio margin (i.e. an SNR gap).

By using equation 1, the ratio of bit numbers allocated to each channel of RGB can be obtained as:

$$b_R : b_G : b_B = \log_2\left(1 + \frac{SNR_R}{\Gamma}\right) : \log_2\left(1 + \frac{SNR_G}{\Gamma}\right) : \log_2\left(1 + \frac{SNR_B}{\Gamma}\right) \quad (2)$$

In equation 2, $SNR_R$, $SNR_G$, and $SNR_B$ represent the SNRs of red light, green light, and blue light, respectively.

Thus, when SNRs are determined according to each wavelength, the ratio of bit numbers available for transmission can be determined by using equation 2.

Thereafter, in step 607, the transmitter inserts information on data rates, which are different depending on each wavelength, into the header of a frame, and transmits the frame together with data to the receiver. In step 609, the receiver receives data by making reference to header information of a received frame, and restores the received data according to the transmission rate of each channel.

Since a channel change may occur at any time, a periodic channel measurement is required for identifying a changed channel. Therefore, in step 611, when a predetermined time period has expired through use of a timer, the transmitter returns to the first step and repeats the aforementioned steps. When there is no channel change, step 613 is performed, wherein it is determined if the user changes an illumination color value. When the user changes the illumination color value, the procedure returns to the first step and repeats the aforementioned steps. In contrast, when the user does not change the illumination color value, that is, when there is no channel change until a predetermined time period has passed, then step 613 is performed, wherein a determination is made whether the user has adjusted the colors. If the user has changed colors, then steps 601-611 are repeated. Otherwise the system is terminated.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

In addition to the aforementioned embodiment, there is a method of calculating an SNR according to each wavelength, selecting the most reliable channel, and transmitting control information (e.g. signaling) through the selected channel, because the importance of the control information is prior to data in general. In this case, whether transmitted information corresponds to control information or data can be identified through the header, too.

The configuration and operation of a data transmission apparatus and method in a wireless visible light communication system according to an exemplary embodiment of the present invention can be achieved as described above. Meanwhile, while the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

According to the present invention, it is possible to provide the highest data rate by controlling the power rate of each wavelength of red, green, and blue, and dividing a data rate according to the signal-to-noise ratio of each wavelength.

What is claimed is:

1. A method for transmitting data in a wireless visible light communication system, the method comprising the steps of:
    transmitting a pilot signal to a receiver, and receiving a pilot response signal from the receiver;
    controlling a data rate according to the pilot response signal transmitted from the receiver; and
    transmitting information on the data rate to the receiver by inserting the data rate information into a header so that the receiver can control a data rate according to each channel by making reference to the data rate information included in the header information.

2. The method as claimed in claim 1, wherein the pilot signal is transmitted to the receiver in order to obtain state information of each channel.

3. The method as claimed in claim 1, wherein the pilot response signal includes state information of each channel, which is determined by the receiver and is received from the receiver.

4. The method as claimed in claim 3, wherein the transmission of the state information of each channel is performed in order to identify a noise level according to each wavelength by making reference to the pilot response signal transmitted from the receiver.

5. The method as claimed in claim 1, wherein, in the step of controlling the data rate, a signal-to-noise ratio according to each wavelength is analyzed and the data rate is controlled to generate light of a color preset by a user.

6. The method as claimed in claim 5, wherein the signal-to-noise ratio according to each wavelength is analyzed in such a manner as to compare an intensity of a color according to each wavelength, which a user wants to implement, with an intensity of noise according to each wavelength, and to control the data rate.

7. The method as claimed in claim 1, wherein, in the step of transmitting the data rate by inserting the data rate into the header, a bit number allocated to each wavelength is obtained, a ratio of bit numbers is determined through use of an obtained signal-to-noise ratio, the ratio of bit numbers is inserted into a header, a channel reliable by a user is selected, and the header including the ratio of bit numbers is transmitted through the selected channel.

8. The method as claimed in claim 7, wherein the bit number allocated to each wavelength is calculated by:

$$b_i = \log_2\left(1 + \frac{SNR_i}{\Gamma}\right),$$

wherein "i" includes red light, green light, and blue light, "$SNR_i$" represents a signal-to-noise ratio of each channel, and "$\Gamma$" represents a signal-to-noise ratio margin (i.e. an SNR gap), that is a minimum signal-to-noise ratio at which a signal can be restored.

9. The method as claimed in claim 7, wherein the ratio of the bit numbers is determined by:

$$b_R : b_G : b_B = \log_2\left(1 + \frac{SNR_R}{\Gamma}\right) : \log_2\left(1 + \frac{SNR_G}{\Gamma}\right) : \log_2\left(1 + \frac{SNR_B}{\Gamma}\right),$$

wherein $SNR_R$, $SNR_G$, and $SNR_B$ represent SNRs of red light, green light, and blue light, respectively.

10. A device comprising:
    a transceiver device operable in a visible light range;
    a processor in communication with a memory, the memory including code which when accessed by the processor causes the processor to:
        transmit a pilot signal to a receiver and receive a pilot response signal from the receiver;
    control a data rate according to the pilot response signal transmitted from the receiver; and
    transmit information on the data rate to the receiver by inserting the data rate information into a header so that the receiver can control a data rate according to each channel by making reference to the data rate information included in the header information.

11. The device as claimed in claim 10, wherein the bit number allocated to each channel is calculated by:

$$b_i = \log_2\left(1 + \frac{SNR_i}{\Gamma}\right),$$

wherein "i" includes red light, green light, and blue light, "$SNR_i$" represents a signal-to-noise ratio of each channel, and "$\Gamma$" represents a signal-to-noise ratio margin (i.e. an SNR gap), that is a minimum signal-to-noise ratio at which a signal can be restored.

12. The device as claimed in claim 10, wherein the ratio of the bit numbers is determined by:

$$b_R : b_G : b_B = \log_2\left(1 + \frac{SNR_R}{\Gamma}\right) : \log_2\left(1 + \frac{SNR_G}{\Gamma}\right) : \log_2\left(1 + \frac{SNR_B}{\Gamma}\right),$$

wherein $SNR_R$, $SNR_G$, and $SNR_B$ represent SNRs of red light, green light, and blue light, respectively.

13. A method for receiving data in a wireless visible light communication system, the method comprising the steps of:
    receiving a pilot signal from a transmitter, and transmitting a pilot response signal to the transmitter so that the transmitter can control a data rate according to the pilot response signal transmitted;
    receiving information on the data rate by inserting the data rate information into a header; and
    controlling a data rate according to each channel by making reference to the data rate information included in the header information.

14. A device comprising:
    a transceiver device operable in a visible light range;
    a processor in communication with a memory, the memory including code which when accessed by the processor causes the processor to:
        receive a pilot signal from a transmitter, and transmit a pilot response signal to the transmitter so that the transmitter can control a data rate according to the pilot response signal transmitted;
    receive information on the data rate by inserting the data rate information into a header; and
    control a data rate according to each channel by making reference to the data rate information included in the header information.

* * * * *